Oct. 11, 1966      L. DIOLOT      3,277,794
SAFETY VALVES FOR HYDRAULIC OR PNEUMATIC DEVICES
Filed May 15, 1964

United States Patent Office 3,277,794
Patented Oct. 11, 1966

3,277,794
SAFETY VALVES FOR HYDRAULIC OR
PNEUMATIC DEVICES
Lucien Diolot, Neuilly-sur-Seine, France, assignor to
Societe Nouvelle Spidem, Paris, France, a corporation
of France
Filed May 15, 1964, Ser. No. 367,700
Claims priority, application France, May 17, 1963,
935,251
8 Claims. (Cl. 91—418)

The present invention relates to safety valves for hydraulic or pneumatic devices.

In the conventional safety valves, the fluid is throttled between the outlet aperture and the valve which is pushed back by the fluid itself and balanced by a compensating force normally produced by a spring. The aperture therefore is larger when the pressure of the fluid exceeds the safety pressure. However, the return to a normal value may be rather slow owing to the fact that there is throttling; moreover the pressure may show a further rise if the outflow proves insufficient, allowing for the swiftness of the phenomenon causing an irregular pressure rise.

In certain applications of pneumatic devices, and more particularly those used for the hydraulic or hydromechanical adjustment of rolling mills, it is therefore necessary that an enclosure be brought quickly to the atmospheric pressure as soon as the safety pressure is exceeded.

Such valves must act quickly, ensure a high outflow and be thoroughly tight when closed.

The primary object of the present invention is the provision of such a safety valve. This valve is mainly characterized by the fact that it is held in a closed position by a spring actuating two linked push-rods buttressed in normal position, the elimination of the buttressing causing the valve to open quickly.

According to another characteristic of this invention, provision is made for a jack so as to eliminate quickly the buttressing of the push-rods, in case of working fault.

Other characteristics of the invention will be indicated in the below description referring to the attached drawings in which.

Figure 1:
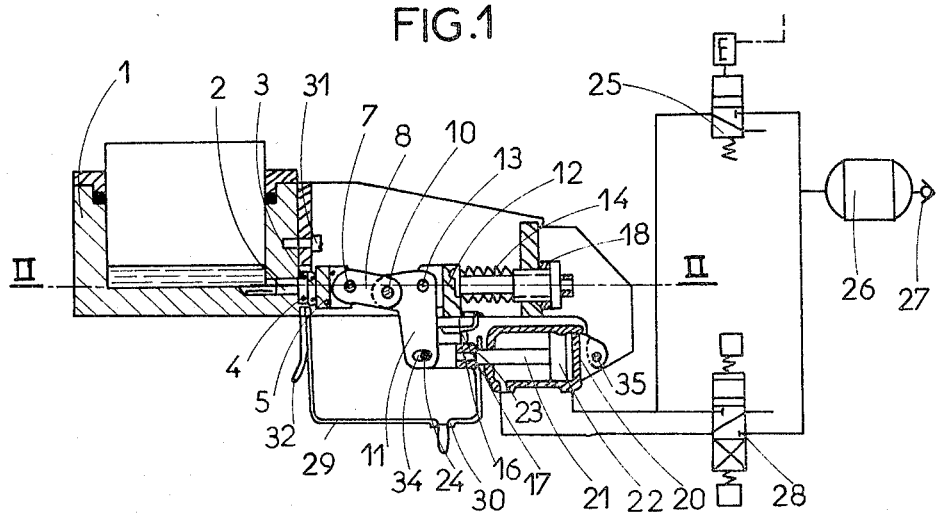
FIGURE 1 is a partially diagrammatic view of the valving system of this invention with a portion of the valve operating elements being shown in sectional elevation and the levers in locked position.
Figure 2:
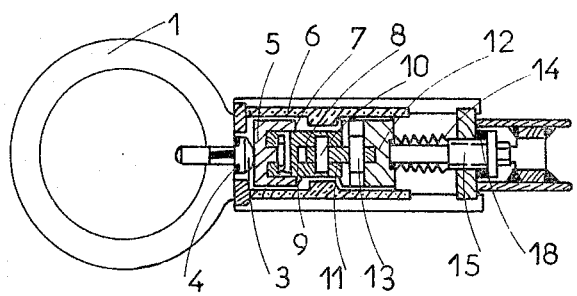
FIGURE 2 is a top plan view in section on line II—II of FIGURE 1.

In the design shown, 1 indicates the jack or piston body which is at the fluid pressure and which must be brought quickly to the atmospheric pressure. 2 shows a valve inside a bore made in cylinder 1. Thus, valve 2 is arranged directly inside the cylinder without tubings, which eliminates the risk of leak. Valve 2 comprises a high tension metal round bearing disc 3; 4 indicates a tight joint. A bearing part 5 slidably arranged in a seal means to provide a carrier 6 abuts bearing disc 3. This bearing part 5 can rotate around a pin 7. Two push-rods 8 and 9 can pivot round pin 7 and another pin 10. An elbow-type push-rod 11 is arranged to rotate around pin 10 and a pin 13 secured to a part 12 guided in carrier 6.

The various pins rotate in low friction coefficient rings or needles secured on the corresponding parts.

14 represents a stack of "Belleville" washers acting as a spring whose pressure is adjusted by means of a screw 15 the nut of which forms a part of the carrier, so as to be above the pressure exerted on valve 2 in the closed position.

A screw 16 is used as a thrust for push-rod 11. The pieces 17 and 18 preserve the adjustment of screws 15 and 16. 20 and 22 represent the body and the piston respectively of a jack 19 which is fastened to carrier 6 by means of a pin 35. Rod 21 of piston 22 is provided with a cap 23 carrying a pin 24. This pin 24 fits into a long port 23 of push rod 11.

Both ends of jack 19 are linked, through tubings, to a four way distributor 28. In the normal position, this distributor connects the pushing end of jack 19 to an electrovalve 25 driven by an electric motor E for the pressurizing or the setting to exhaust. Other two positions of distributor 28 make it possible to connect the pushing end of jack 19 directly to compressed air vessel 26 and the pulling end to the atmosphere, and conversely. Compressed air vessel 26 is connected to the main network or to a compressor through a non-return valve 27.

An expansion tank 29 makes it possible to recover the fluid flowing through open valve 2. It can be connected to a recovery tank by means of tubing 30.

A small section of tubing 32 is arranged directly to the outlet of valve 2.

Carrier 6 is held on body 1 by means of screws 31 which must withstand the stress exerted by the stack of "Belleville" washers 14.

The safety valve according to the present invention operates as follows:

In the normal position shown in FIGURE 1, pin 10 is located slightly below the line of both pins 13 and 7. Consequently, valve 2 is held in the closed position by the pressure exerted by "Belleville" washer stack 14 acting on push-rods 8, 9 and 11 buttressed and locked by thrust 16. Tubing 32 permits checking the tightness of seal 4 which must be faultless.

Figure 3:
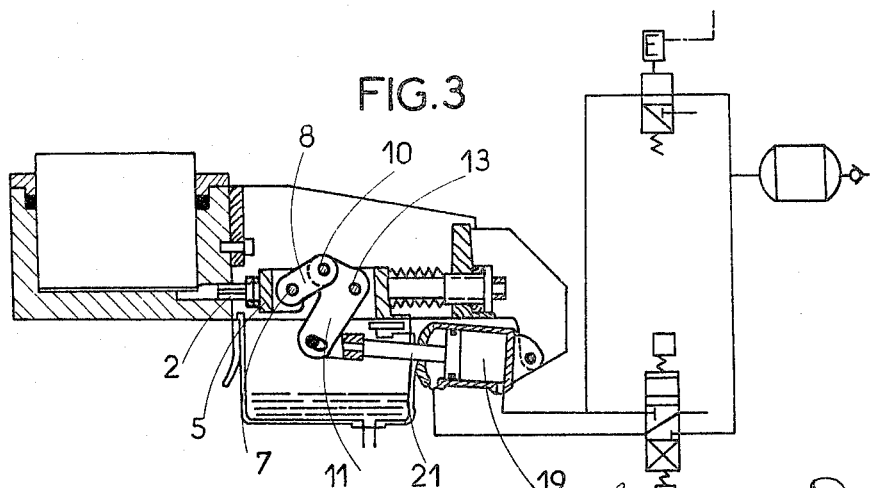
FIGURE 3 is another partially diagrammatic view with the same elements shown in sectional elevation and the levers shown in unlocked or released position.

Should a working fault arise, an electric signal is sent to electrovalve 25. The pushing end of jack 19 is pressurized. Since the pulling end is at exhaust, the action of rod 21 is quick and eliminates, after a very short stroke, the buttressing of push-rods which are consequently unclamped. The stacking of "Belleville" washers 14 operates and valve 2 opens quickly. The fluid contained in body 1 is recovered into the expansion tank and can be returned to the main tank so as to be used again. Then the valve according to the invention sets to the position shown in FIGURE 3.

The upper position of distributor 28 makes it possible to close valve 2 again. In fact, the pulling end of jack 19 is pressurized, the pushing end set to exhaust, and the operation is carried out in the reverse order.

The lower position of distributor makes it possible to open valve 2, if electrovalve 25 is no more supplied with current.

Non-return valve 27 holds the compressed air of vessel 26 pressurized in case of pressure drop in the main network. Consequently, the valve according to the invention can operate, even in case of compressed air failure, for example.

An alternative of the present invention consists in arranging thrust 16 at the top of push-rod 11, the buttressing of the push-rods being directed towards the top.

Another alternative consists, the buttressing being directed towards the top, in hanging a weight below pin 10, this weight being fastened to a fixed element and unfastened from this fixed element, should a working fault arise, by electromagnetic action or manually, in case of current failure. This makes it possible to do without compressed air installation.

Of course, the present invention is in no way limited to the above detailed applications which are only illustrative.

What is claimed:

1. In an improved safety valve system for fluid responsive means, the combination comprising a cylinder containing fluid, a carrier rigidly secured to said cylinder means, a piston in said cylinder, means defining an opening in asid cylinder adapted to receive a valve means, valve means positioned in said opening, bearing means slidably arranged in said carrier and adapted to abut said valve means, pivotally interconnected clamping lever means associated with said bearing means, control means for moving said lever means from a locked condition to a freely pivotal unlocked position and secondary means for rapidly advancing the pivoting of said levers to further retract the valve from said cylinder.

2. In an improved safety valve system for fluid responsive means, the combination comprising a cylinder containing fluid, a carrier rigidly secured to said cylinder means, a piston in said cylinder, means defining an opening in said cylinder adapted to receive a valve means, valve means positioned in said opening, bearing means slidably arranged in said carrier and adapted to abut said valve means, a second cylinder spacedly arranged relative to said valve means, a piston in said cylinder and pivotally interconnected clamping lever means associated with said bearing means and said piston, inlet and exhaust means in said second cylinder, means for controlling the actuation of said piston through said inlet and exhaust means in said second cylinder and means for moving said lever means from a locked condition to a freely pivotal unlocked position and secondary means for rapidly advancing the pivoting of said levers to further retract the valve from said cylinder.

3. In an improved safety valve system for fluid responsive means as claimed in claim 1, wherein the valve means positioned in said opening in said cylinder is adapted to reciprocate.

4. In an improved safety valve system for fluid responsive means as claimed in claim 1, wherein the lever means are slidably arranged in said carrier means.

5. In an improved safety valve system for fluid responsive means as claimed in claim 2, wherein the second cylinder spacedly arranged from said first cylinder is mounted for oscillation in asid carrier means.

6. In an improved safety valve system for fluid responsive means as claimed in claim 1, wherein the secondary means for rapidly advancing the pivoting of said lever means comprises a spring means in axial alignment with said valve means.

7. In an improved safety valve system for fluid responsive means as claimed in claim 6, wherein the spring means for rapidly advancing the pivoting of said lever means comprises a stack of Belleville spring means.

8. In an improved safety valve system for fluid responsive means as claimed in claim 6, wherein means positioned exteriorly of said carrier are provided for adjusting the tension of said Belleville spring means.

References Cited by the Examiner

UNITED STATES PATENTS

| 1,967,981 | 7/1934 | Thomas | 251—58 X |
| 2,213,412 | 9/1940 | Rosskopf | 251—58 |
| 2,301,850 | 11/1942 | Bjergel | 251—58 |
| 2,687,118 | 8/1954 | Bennett | 91—215 X |
| 2,937,845 | 5/1960 | Rocque | 251—58 X |

MARTIN P. SCHWADRON, *Primary Examiner.*

SAMUEL LEVINE, *Examiner.*

P. T. COBRIN, *Assistant Examiner.*

UNITED STATES PATENT OFFICE
CERTIFICATE OF CORRECTION

Patent No. 3,277,794　　　　　　　　　　　　　　　October 11, 1966

Lucien Diolot

It is hereby certified that error appears in the above numbered patent requiring correction and that the said Letters Patent should read as corrected below.

Column 3, line 6, for "asid" read -- said --; column 4, line 9, for "asid" read -- said --; line 20, for "claim 6" read -- claim 7 --.

Signed and sealed this 22nd day of August 1967.

(SEAL)
Attest:

ERNEST W. SWIDER
Attesting Officer

EDWARD J. BRENNER
Commissioner of Patents